(12) United States Patent
Schulte et al.

(10) Patent No.: US 7,962,543 B2
(45) Date of Patent: Jun. 14, 2011

(54) DIVISION WITH RECTANGULAR MULTIPLIER SUPPORTING MULTIPLE PRECISIONS AND OPERAND TYPES

(75) Inventors: Michael J. Schulte, Madison, WI (US); Carl E. Lemonds, Jr., Austin, TX (US); Dimitri Tan, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1045 days.

(21) Appl. No.: 11/756,885

(22) Filed: Jun. 1, 2007

(65) Prior Publication Data

US 2008/0301213 A1    Dec. 4, 2008

(51) Int. Cl.
G06F 7/535    (2006.01)

(52) U.S. Cl. ...................................... 708/654

(58) Field of Classification Search .................. None
See application file for complete search history.

(56) References Cited

U.S. PATENT DOCUMENTS

| | | | |
|---|---|---|---|
| 4,878,190 A | | 10/1989 | Darley et al. |
| 5,249,149 A | * | 9/1993 | Cocanougher et al. ........ 708/504 |
| 5,250,524 A | * | 10/1993 | Kramer et al. ................ 514/177 |
| 6,223,192 B1 | | 4/2001 | Oberman |
| 7,599,982 B1 | * | 10/2009 | Rarick ........................... 708/654 |
| 7,738,657 B2 | * | 6/2010 | Gopal et al. ..................... 380/28 |
| 2004/0128338 A1 | | 7/2004 | Even et al. |
| 2006/0064454 A1 | * | 3/2006 | Wang et al. .................... 708/651 |

OTHER PUBLICATIONS

Raman, et al, "Implementing Streaming SIMD Extensions on the Pentium III Processor", IEEE Micro, vol. 20, No. 4, pp. 47-57, Jul. 2000.

Advanced Micro Devices, AMD64 Architecture Programmer's Manual vol. 5: 64-Bit Media and x87 Floating-Point Instructions, Revision 3.07, Sep. 2006.

ANSI and IEEE, IEEE Standard for Binary Floating-point Arithmetic, 1985.

Ma, et al, "Using Intel Streaming SIMD Extensions for 3D Geometry Processing", Proceedings of the 3rd IEEE Pacific-Rim Conference on Multimedia, pp. 1080-1087, Dec. 2002.

Li, et al, "The ALPBench Benchmark Suite for Complex Multimedia Applications", Proceedings of the IEEE International Workload Characterization Symposium, pp. 34-45, Oct. 2005.

Oberman, et al, "Division Algorithms and Implementations", IEEE Transactions on Computers, vol. 46, No. 8, pp. 833-854, Aug. 1997.

P. Markstein, "Software Division and Square Root Using Goldschmidt's Algorithms", Proceedings of the 6th Conference on Real Numbers and Computers, pp. 146-157, Nov. 2004.

Wong, et al, "Fast Division Using Accurate Quotient Approximations to Reduce the Number of Iterations", IEEE Transactions on Computers, vol. 41, No. 8, pp. 981-995, Aug. 1992.

(Continued)

Primary Examiner — David H Malzahn

(57) ABSTRACT

A division method includes determining a precision indicator for the division operation that indicates whether the quotient should be a single precision, double precision, or extended precision floating-point number. The division is performed at a rectangular multiplier using the Goldschmidt or Newton-Raphson algorithm. Each algorithm calculates one or more intermediate values in order to determine the quotient. For example, the Goldschmidt algorithm calculates a complement of a product of the dividend and an estimate of the reciprocal of the divisor. The quotient is determined based on a portion of one or more of these intermediate values. Because only a portion of the intermediate value is used, the division can be performed efficiently at the rectangular multiplier, and therefore the quotient can be determined more quickly and still achieve the desired level of precision.

20 Claims, 4 Drawing Sheets

OTHER PUBLICATIONS

Briggs, et al, "A 17 x 69 Bit Multiply and Add Unit with Redundant Binary Feedback and Single Cycle Latency", Proceedings of the 11th IEEE Symp. Computer Arithmetic, pp. 163-170, Jul. 1993.

Ercegovac, et al, "Very High Radix Division with Prescaling and Selection by Rounding", IEEE Transactions on Computers, vol. 43, No. 8, pp. 909-918, Aug. 1994.

Montuschi, et al, "Boosting Very High Radix Division with Prescaling and Selection by Rounding", IEEE Transactions on Computers, vol. 50, No. 1, pp. 13-27, Jan. 2001.

M. Flynn, "On Division by Functional Iteration", IEEE Transactions on Computers, vol. 19, No. 8, pp. 702-706, Aug. 1970.

R. E. Goldschmidt, "Applications of Division by Convergence", M. S. Thesis, Dept. of Electrical Engineering, MIT, Cambridge, MA, Jun. 1964, citable at http://dspace.mit.edu/bitstream/handle/1721.1/11113/34136725.pdf?sequence=1.

S. F. Oberman, "Floating-point Division and Square Root Algorithms and Implementation in the AMD-K7 Microprocessor", In Proceedings of the 14th IEEE Symposium on Computer Arithmetic, p. 106-115, 1999.

Fowler, et al, "An Accurate, High Speed Implementation of Division by Reciprocal Approximation", Proceedings of the Ninth IEEE Symposium on Computer Arithmetic, pp. 60-67, Sep. 1989.

P. W. Markstein, "Computation of Elementary Function on the IBM RISC System/6000 Processor", IBM Journal of Research and Development, pp. 111-119, Jan. 1990.

Anderson, et al, "The IBM System/360 Model 91: Floating-Point Execution Unit", IBM Journal of Research and Development, vol. 11, pp. 34-53, Jan. 1967.

Schwarz, et al, "CMOS Floating-point Unit for the S/390 Parallel Enterprise Server G4", IBM Journal of Research and Development, vol. 41, No. 4/5, pp. 475-488, Jul./Sep. 1997.

Aggarwal, et al, "Series Approximation Methods for Divide and Square Root in the Power3 Microprocessor", Proceedings of the 14th IEEE Symposium on Computer Arithmetic, pp. 115-123, Apr. 1999.

Cornea-Hasegan, et al, "Correctness Proofs Outline for Newton-Raphson Based Floating-point Divide and Square Root Algorithms", Proceedings of the 14th IEEE Symposium on Computer Arithmetic, pp. 96-104, Apr. 1999.

Even, et al, "A Parametric Error Analysis of Goldschmidt's Division Algorithm", 16th IEEE Symposium on Computer Arithmetic, pp. 165-171, Jun. 2003.

* cited by examiner

US 7,962,543 B2

DIVISION WITH RECTANGULAR MULTIPLIER SUPPORTING MULTIPLE PRECISIONS AND OPERAND TYPES

FIELD OF THE DISCLOSURE

The present disclosure relates to data processors and more particularly to floating point division operations on a data processor.

BACKGROUND

Data processors typically employ a floating-point unit (FPU) to perform floating point arithmetic. An FPU performs arithmetic operations such as addition, subtraction, multiplication, and division. Typically, a division operation requires the FPU to execute several operations, such as several multiplication and addition operations. The faster the FPU can execute a division operation, the faster and more efficiently the data processor can execute instructions. Accordingly, there is a need for an improved method of performing a division operation on an FPU.

BRIEF DESCRIPTION OF THE DRAWINGS

The present disclosure may be better understood, and its numerous features and advantages made apparent to those skilled in the art by referencing the accompanying drawings.

DETAILED DESCRIPTION

A method for performing division using a rectangular multiplier of a floating-point unit is disclosed. The method includes determining a precision indicator for the division operation that indicates whether the quotient should be a single precision, double precision, or extended precision floating-point number. The division is performed at a rectangular multiplier using the Goldschmidt or Newton-Raphson algorithm. Each algorithm calculates one or more intermediate values in order to determine the quotient. For example, the Goldschmidt algorithm calculates a complement of a product of the dividend and an estimate of the reciprocal of the divisor. The quotient is determined based on a portion of one or more of these intermediate values. Because only a portion of the intermediate value is used, the division can be performed efficiently at the rectangular multiplier, and therefore the quotient can be determined more quickly and still achieve the desired level of precision.

Figure 1:
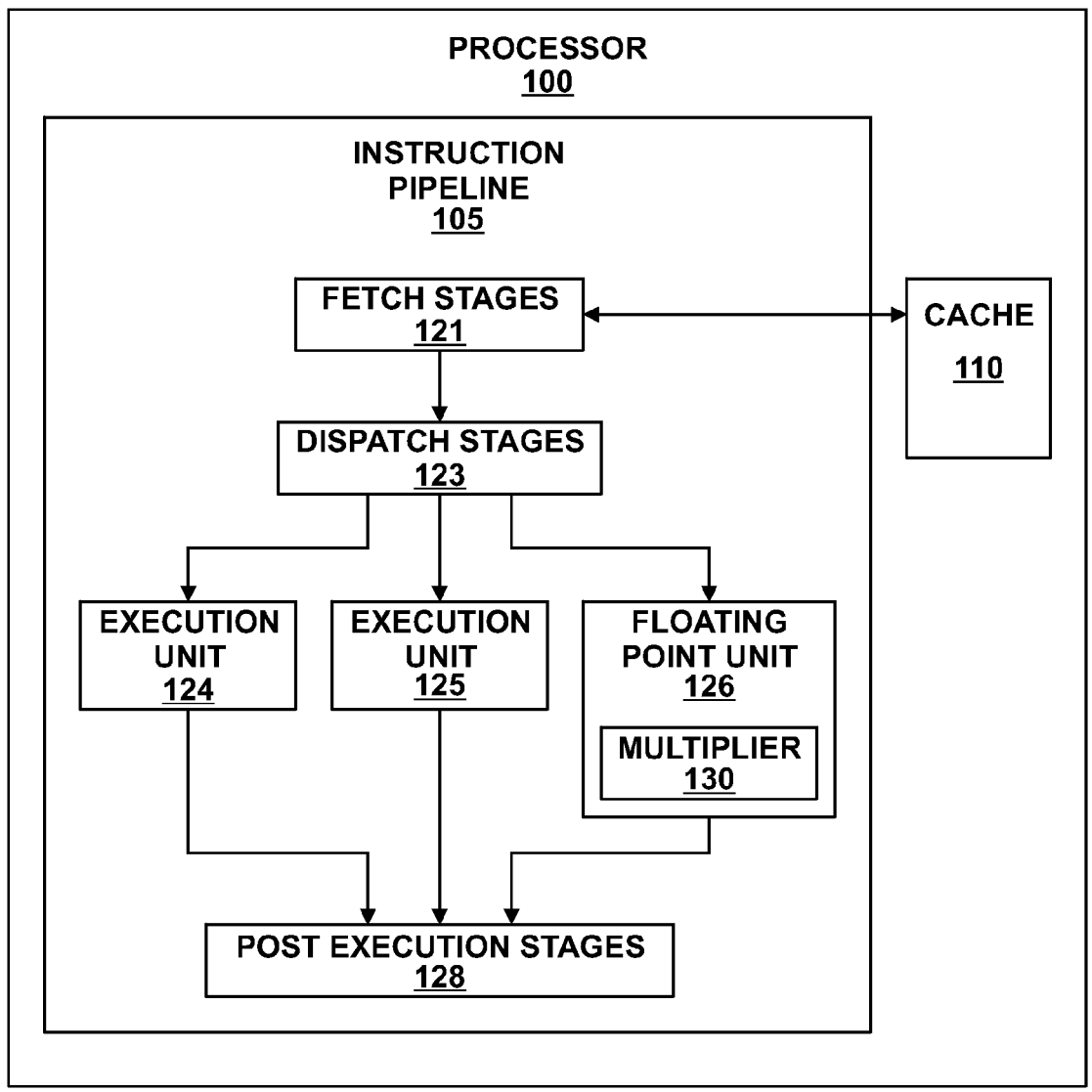
FIG. 1 is a block diagram of a particular embodiment of a data processor.

Referring to FIG. 1, a block diagram of a particular embodiment of a data processor 100 is illustrated. The data processor 100 includes an instruction pipeline 105 and a cache 110. The instruction pipeline 105 includes fetch stages 121, a dispatch stage 123, a plurality of execution units including execution units 124 and 125, a floating-point unit 126, and post execution stages 128.

The fetch stages 121 are illustrated as having a bi-directional connection to the cache 110 in that the fetch stages 121 are able to provide an address to the cache 110 and receive data based on the address. The fetch stages 121 also include an output. The dispatch stage 123 includes an input connected to the output of the fetch stages 121 and three outputs. The execution unit 124 includes an input connected to a first output of the dispatch stage 123 and an output. The execution unit 125 includes an input connected to a second output of the dispatch stage 123 and an output. The floating-point unit 126 includes an input connected to a third output of the dispatch stage 123 and an output. The post execution stages 128 include an input connected to the output of the execution unit 124, an input connected to the output of the execution unit 125, and an input connected to the output of the floating-point unit 126.

The cache 110 stores data for the instruction pipeline 105, including instruction data and operand data. It will be appreciated that although the cache 110 is illustrated as a single cache, it can represent multiple caches, such as separate caches for instruction data and operand data. In addition, the cache 110 may be accessible to other stages of the instruction pipeline 105, even though specific connections to the stages are not illustrated. For example, the execution units, such as the execution units 124 and 125, may be able to access the cache 110 to retrieve and store data.

During operation, the instruction pipeline 105 executes instructions at the data processor 100. To execute an instruction, the fetch stages 121 fetch instruction data from the cache 110. The fetch stages 121 decode the instruction data to obtain instruction information and, based on the instruction information, retrieve operand data from the cache 110. For example, in the case of a division instruction, the fetch stages 121 can retrieve the divisor and dividend from the cache 110.

The fetch stages 121 provides the instruction information and the operand data to the execution unit 124, the execution unit 125, or the floating-point unit 126 for execution. For example, if the instruction information indicates that the instruction requires a floating point operation, the instruction information and the operand data is provided to the floating-point unit 126.

The execution units 124 and 125, as well as the floating-point unit 126, provide the instruction information to the post-execution stages 128, which provides post-execution processing of the information. For example, the post-execution stages 128 can retire instructions, detect exceptions resulting from execution of the instructions, and the like.

The floating-point unit 126 executes instructions that require floating point operations, including addition, subtraction, multiplication, and division. The floating-point unit 126 includes a multiplier 130 to execute multiplication and division operations. In a particular embodiment, the multiplier 130 is a rectangular multiplier. A rectangular multiplier is characterized by having input operands of different sizes. For example, a 27×76 rectangular multiplier uses one operand of 27 bits and another of 76 bits. To execute a division operation, the floating-point unit 126 receives operand information from the dispatch stage 123, including a divisor and dividend. The dispatch stage 123 also provides instruction information, including a precision indicator to indicate whether the quotient should be a single precision value, a double precision value, or an extended precision value according to a specific standard, such as the IEEE-754 Standard for Binary Floating Point Arithmetic. The precision indicator can include precision control information that indicates the desired level of precision of the quotient, as well as operand type information that indicates the precision level of the division operands.

In one embodiment, the floating-point unit 126 uses a Goldschmidt algorithm to perform division. The Goldschmidt algorithm computes the quotient Q=A/B by determining an estimate of the divisor's reciprocal:

$$X_0 \approx \frac{1}{B}$$

The following values are then determined:

$N_0 = X_0 \times A$ $D_0 = X_0 \times B$ $R_0 = 2 - D_0$

Subsequently, m−1 iterations are performed to calculate the following values:

$N_{i+1} = R_i \times N_i$ $D_{i+1} = R_i \times D_i$ $R_{i+1} = 2 - D_{i-1}$

Once the m−1 iterations have been performed, the quotient Q is obtained as follows:

$Q = N_{m+1} \times R_{m+1}$

The number of iterations depends on the desired level of precision of the quotient Q as well as the accuracy of the estimate $X_0$. Accordingly, the less accurate the estimate $X_0$ and the higher the desired level of precision for the quotient Q, the greater the number of iterations performed before the quotient is determined.

In a particular embodiment, reduced values for $R_i$, including $R_0$, are used to calculate the $N_i$ and $D_i$ values and the quotient Q. As used herein, the term reduced means that one or more of the most significant bits, one or more of the least significant bits, or both are removed from a binary value. For example, the value $R_0$ may be a 76 bit value, and can be reduced by removing its least significant bits so that the reduced value is a 30 bit value. In addition, the $R_i$ values may be reduced by different amounts for different iterations. For example, the value $R_0$ may be reduced to a 30 bit value while the value $R_1$ is reduced to a 60 bit value. By reducing the values for $R_i$, the division operations can be executed more efficiently at the multiplier 130 than with a multiplier that uses operands of equal sizes, while still achieving the desired level of precision for the quotient Q.

In another embodiment, the floating-point unit 126 uses a Newton-Raphson algorithm to determine the quotient Q=A/B. The floating-point unit determines the estimate of the divisor's reciprocal:

$$X_0 \approx \frac{1}{B}$$

and performs m iterations of the following equations:

$R_i = 2 - X_i \times B$ $X_{i+1} = X_i \times R_i$

After m iterations of these equations, $X_m$ is multiplied by A to obtain the quotient Q. The number of iterations depends on the desired level of precision of the quotient Q as well as the accuracy of the estimate $X_0$.

In a particular embodiment, reduced values for $R_i$, and $X_i$ are used to calculate the $R_i$ and $X_{i+1}$ values and the quotient Q. In addition, the values may be reduced by different amounts for different iterations. By reducing the values for $R_i$ and $X_i$, the division operations can be executed more efficiently at the multiplier 130 while still achieving the desired level of precision for the quotient Q.

Figure 2:
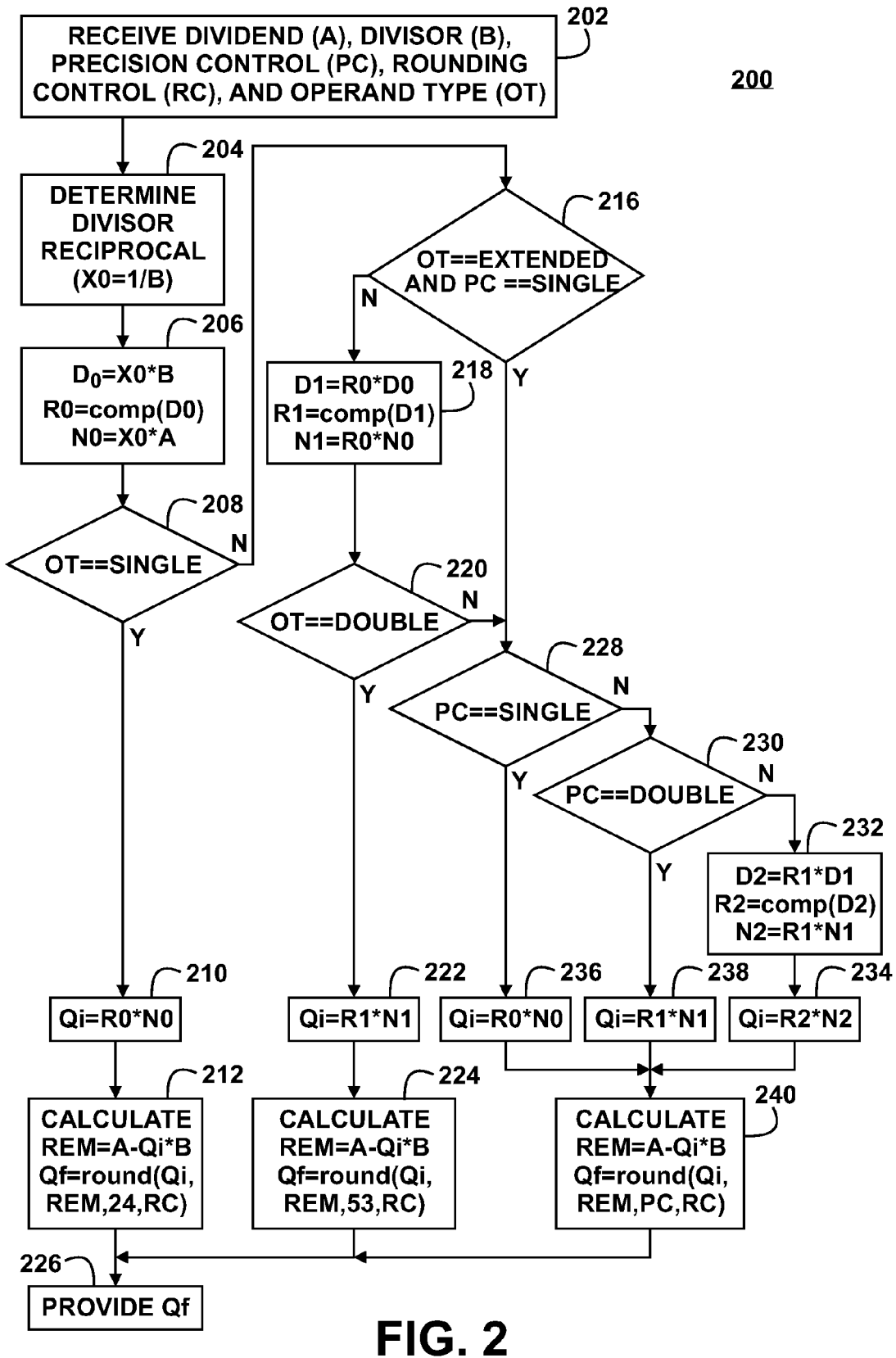
FIG. 2 is a flow diagram of a particular embodiment of a method of performing division at a rectangular multiplier.

Referring to FIG. 2, a flow diagram of a particular embodiment of a method 200 to determine a quotient Q with a rectangular multiplier is shown.

At block 202 input values are received, including a dividend A, a divisor B, a precision control indicator PC, an operand type indicator OT, and a rounding control indicator RC. The operand type indicator OT indicates whether the operands, including dividend A and the divisor B are single precision operands, double precision operands, or extended precision operands. The precision control information PC indicates the desired precision of the quotient when the operand type indicator OT indicates the operands are extended precision values. The rounding control indicator RC indicates whether the quotient $Q_f$ should be rounded to the nearest-even, rounded toward zero, rounded toward minus infinity, or rounded toward plus infinity.

At block 204, the reciprocal estimate ($X_0$) of the divisor B is determined. The reciprocal estimate can be determined using a lookup table or other method. In a particular embodiment, the reciprocal estimate is determined using $2^{10}$ by 16 and $2^{10}$ by 7 bipartite tables to provide a reciprocal estimate accurate to at least 14.94 bits.

At block 206, values $D_0$, $R_0$, and $N_0$ are calculated. The value $D_0$ is calculated by performing a rectangular multiplication of the value $X_0$ and the divisor B. As used herein, the term "rectangular multiplication" refers to a multiplication using operands of different sizes. For example, a 27×76 rectangular multiplier performs a multiplication of a first operand with a size of 27 bits and a second operand with a size of 76 bits. In a preferred embodiment, the size of the first operand can be increased by iteratively performing multiplication operations at the rectangular multiplier. For example, the 27×76 rectangular multiplier can perform a 54×76 rectangular multiply be executing two iterative multiplications and one addition at the multiplier.

At block 206, the value $R_0$ is determined by calculating the 1's compliment of $D_0$. The value $N_0$ is determined by performing a rectangular multiplication of the dividend A and the value $X_0$. In an exemplary embodiment where the reciprocal estimate $X_0$ is accurate to at least 14.94 bits, the values $D_0$ and $N_0$ are accurate to at least 27 bits.

At block 208, it is determined whether the operand type indicator indicates that the received operands are single precision values. If so, the method flow proceeds to block 210 and a value $Q_i$ is determined based on the value $N_0$ and a value based on a portion of the value $R_0$. In a particular embodiment, the value $R_0$ is reduced by removing one or more of its least significant bits to form a reduced complement value. The value $Q_i$ is determined by performing a rectangular multiplication of the value $N_0$ with the reduced complement value $R_0$. By using a reduced complement value, the multiplication can be performed with fewer iterations at the rectangular multiplier, thereby improving the efficiency of the division operation while still obtaining a desired level of precision of the quotient.

In another embodiment, the value $R_0$ is reduced by removing one or more most significant bits and one or more least significant bits from the value to form a reduced $R_0$ value. The value $Q_i$ is determined by performing a fused rectangular multiplication and add operation, where a rectangular multiplication is performed using the truncated $R_0$ value and the value $N_0$ and the result is added to the value $N_0$. In a particular embodiment, the value $R_0$ is a 76 bit value and the truncated $R_0$ value is formed by bits 13-39 of the value $R_0$.

At block 212 the value $Q_i$ is rounded, based on the rounding control RC, to 24 bits of precision to obtain the single precision floating-point quotient $Q_f$. To determine how the quotient will be rounded, a remainder REM is determined by performing a rectangular multiplication of the divisor B by the value $Q_i$, and subtracting the result from the dividend A. The remainder REM indicates if the value $Q_i$ is greater than, less than, or equal to the true quotient Q. In an exemplary embodiment, in response to the rounding control indicator RC indicating the result $Q_f$ should not be less than the quotient Q, the rounding ensures that the single precision result $Q_f$ is greater than or equal to the quotient Q. In an alternative embodiment, in response to the rounding control indicator RC indicating the result $Q_f$ should not be more than the quotient Q, the rounding can ensure that the single precision result $Q_f$ is less than or equal to the quotient Q. At block 226, the rounded single precision quotient value $Q_f$ is provided.

Returning to block 208, if it is determined that the operand type indicator OT indicates that the operands are not single precision values, the method flow moves to block 216. At block 216, it is determined whether the operand type indicator OT indicates that the operands are extended precision values and whether the precision control indicates that the quotient result should be a single precision value. If so, the method flow moves to block 228, described below. If not, the method flow moves to block 218, and a value $D_1$, a value $R_1$, and a value $N_1$ are determined. In one embodiment, the value $D_1$ is calculated by removing one or more of the least significant bits from the value $R_0$ to form a reduced complement value and performing a rectangular multiplication of the values $D_0$ and the reduced complement value based on the value $R_0$. In a particular embodiment, the value $R_0$ is a 76 bit value and the reduced complement value is formed by the 54 most significant bits of $R_0$. In addition, the value $N_1$ is calculated by performing a rectangular multiplication of the values $N_0$ and the reduced complement value $R_0$. The value $R_1$ is determined by computing the complement of the value $D_1$.

In an alternative embodiment, the reduced complement value is formed by removing one or more of the least significant bits and one or more of the most significant bits of the value $R_0$. In a particular embodiment, $R_0$ is a 76 bit value and the reduced complement value is formed by bits 13-39 of the value $R_0$. The value $D_1$ is calculated by performing a multiply-add operation at a rectangular multiplier with the reduced complement value and the value $D_0$. The value $N_1$ is calculated by performing a multiply-add operation at a rectangular multiplier with the reduced complement value and the value $D_0$. The value $R_1$ is determined by determining the complement of the value $D_1$.

At block 220, it is determined whether the operand type indicator OT indicates that the operand types are double precision values. If so, the method flow moves to block 222. At block 222, a quotient value $Q_i$ is calculated. In one embodiment, the quotient value $Q_i$ is calculated by performing a rectangular multiplication of the values $R_1$ and $N_1$.

In another embodiment, a reduced complement value is formed by removing one or more least significant bits from the value $R_1$. In a particular embodiment, $R_0$ is a 76 bit value and the reduced complement value is formed by bits 26-75 of the value $R_0$. The quotient value $Q_i$ is calculated by performing a multiply-add operation at a rectangular multiplier using the reduced complement value and the value $N_1$.

At block 224, a remainder REM is determined by performing a rectangular multiplication of the quotient value $Q_i$ and the divisor B and subtracting the result from the dividend A. The remainder REM indicates if the value $Q_i$ is greater than, less than, or equal to the quotient Q. Based on this information, and the rounding control indicator RC, the quotient value $Q_i$ is rounded to obtain the quotient $Q_f$. For example, in response to the rounding control indicator RC indicating the result $Q_f$ should not be less than the quotient Q, the rounding ensures that the single precision result $Q_f$ is greater than or equal to the quotient Q. In an alternative embodiment, in response to the rounding control indicator RC indicating the quotient value $Q_f$ should not be more than the quotient Q, the rounding can ensure that the single precision quotient value $Q_f$ is less than or equal to the quotient Q. At block 226, the quotient value result $Q_f$ is provided.

Returning to block 220, if the operand type indicator OT does not indicate that the operands are double precision operands, the method flow moves to block 228. At block 228, it is determined whether the precision control indicator PC indicates that the quotient value should be a single precision value. If not, the method flow moves to block 230.

At block 230, it is determined whether the precision control indicator PC indicates that the quotient value should be a double precision value. If not, the method flow moves to block 232. At block 232, values $N_2$, $R_2$ and $D_2$ are calculated. In a particular embodiment, the value $N_2$ is calculated by performing a rectangular multiplication of the values $R_1$ and $N_1$, the value $D_2$ is calculated by performing a rectangular multiplication of the values $R_1$ and $D_1$, and the value $R_2$ is calculated by determining a complement value of the value $D_2$.

In another embodiment, a reduced $R_1$ value is formed by removing one or more of the least significant bits and one or more most significant bits of the value $R_1$. In a particular embodiment, the reduced $R_1$ value is the value of bits 26-75 of the value $R_1$. The value $N_2$ is calculated by performing a multiply-add operation using the reduced $R_1$ value and the value $N_1$. The value $D_2$ is calculated by performing a multiply-add operation using the reduced $R_1$ value and the value $D_1$. The value $R_2$ is calculated by determining a complement value of the value $D_2$.

The method flow moves to block 234, and a quotient value $Q_i$ is determined by performing a rectangular multiplication operation on the value $R_2$ and the value $N_2$. The method flow moves to block 240, and a remainder REM is calculated by performing a rectangular multiplication of the divisor B and the value $Q_i$ and subtracting the result from the dividend A. The remainder REM indicates if the value $Q_i$ is greater than, less than, or equal to the quotient Q. Based on the remainder REM and the rounding control indicator RC, the quotient $Q_f$ is determined. In an exemplary embodiment, in response to the rounding control indicator RC indicating the result $Q_f$ should not be less than the quotient Q, the rounding ensures that the single precision result $Q_f$ is greater than or equal to the quotient Q. In an alternative embodiment, in response to the rounding control indicator RC indicating the result $Q_f$ should not be more than the quotient Q, the rounding can ensure that the single precision result $Q_f$ is less than or equal to the quotient Q. The method flow proceeds to block 226 and the quotient $Q_f$ is provided.

At block 230, in response to the operand type indicator OT indicating the operands are double precision operands, the method flow moves to block 238. At block 238, the quotient value $Q_i$ is calculated. In a particular embodiment, the quotient $Q_i$ is calculated by performing a rectangular multiplication on the values $N_1$ and $R_1$.

In another embodiment, a reduced complement value is formed by removing one or more most significant bits from the value R and the quotient value $Q_i$ is calculated by performing a multiply-add operation at a rectangular multiplier using the reduced complement value and the value $N_1$. In a particular embodiment, $R_0$ is a 76 bit value and the reduced complement value is formed by bits 26-75 of the value $R_0$.

At block 228, in response to the operand type indicator OT indicating the operands are single precision operands, the method flow moves to block 236. At block 236, the quotient value $Q_i$ is calculated. In a particular embodiment, the quotient value $Q_i$ is determined based on the value $N_0$ and a value based on a portion of the value $R_0$. In a particular embodiment, the value $R_0$ is reduced by removing one or more of its least significant bits to form a reduced complement value. The value $Q_i$ is determined by performing a rectangular multiplication of the value $N_0$ with the reduced complement value.

In another embodiment, the value $R_0$ is reduced by removing one or more most significant bits and one or more least significant bits from the value to form a reduced $R_0$ value. The value $Q_i$ is determined by performing a rectangular multiplication and add operation, where a rectangular multiplication is performed using the reduced $R_0$ value and the value $N_0$ and the result is shifted and added to the value $N_0$. In a particular embodiment, the value $R_0$ is a 76 bit value and the reduced $R_0$ value is formed by bits 13-39 of the value $R_0$.

Figure 3:
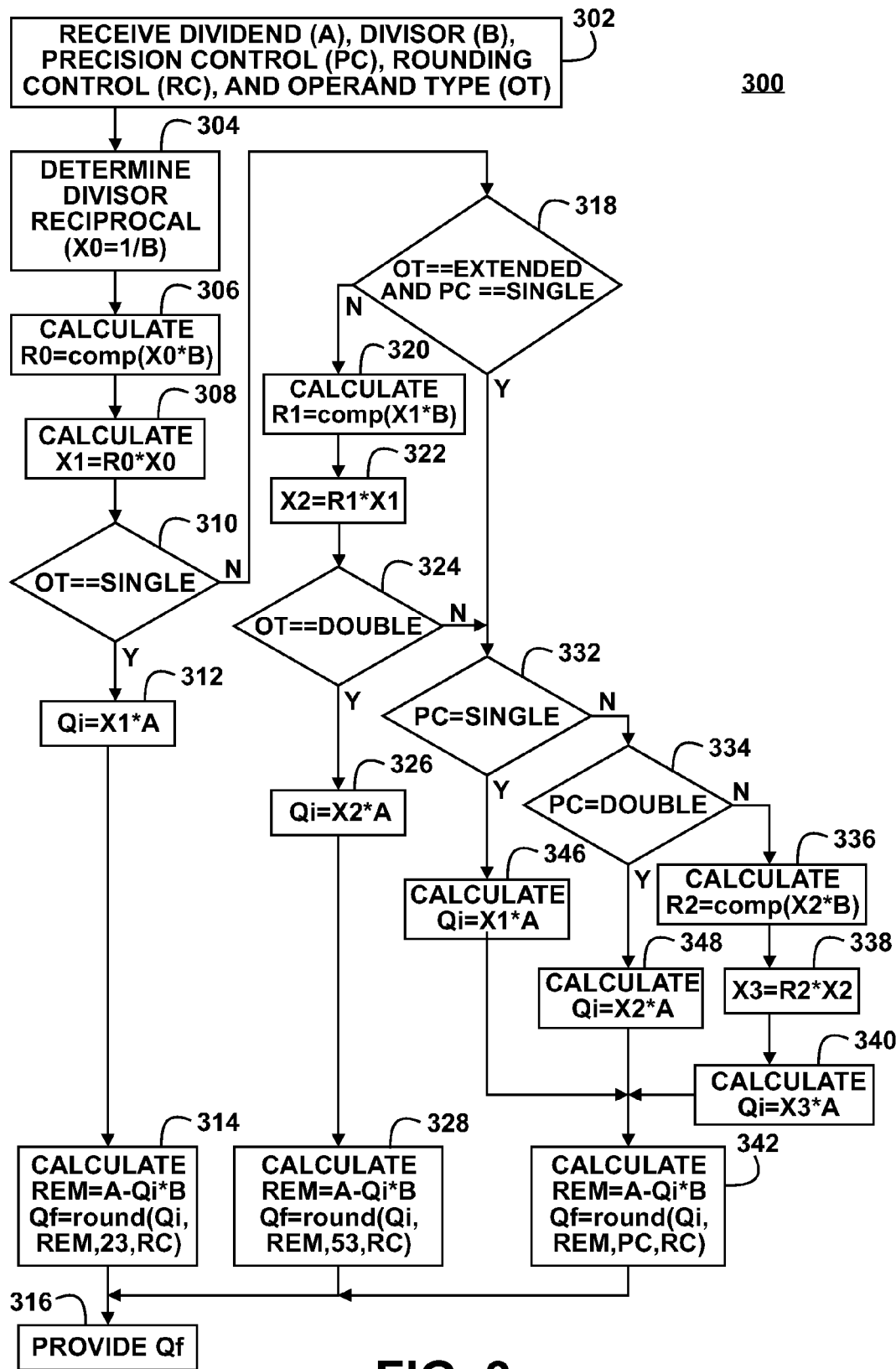
FIG. 3 is a flow diagram of an alternative particular embodiment of a method of performing division at a rectangular multiplier.

Referring to FIG. 3, an exemplary method to determine a quotient Q is shown and generally designated 300. At block 302 input values are received, including a dividend A, a divisor B, a precision control indicator PC, an operand type indicator OT, and a rounding control indicator RC. The operand type indicator OT indicates whether the operands, including dividend A and the divisor B are single precision operands, double precision operands, or extended precision operands. The precision control information PC indicates the desired precision of the quotient while the operand type indicator OT indicates the operands are extended precision values. The rounding control indicator RC indicates whether the quotient $Q_f$ should be rounded to the nearest-even, rounded toward zero, rounded toward minus infinity, or rounded toward plus infinity.

At block 304, the reciprocal estimate ($X_0$) of the divisor B is determined. The reciprocal estimate can be determined using a look up table or other method. In a particular embodiment, the reciprocal estimate is determined using $2^{10}$ by 16 and $2^{10}$ by 7 bipartite tables to provide a reciprocal estimate accurate to at least 14.94 bits.

At block 306, the value $R_0$ is determined by performing a rectangular multiplication of the divisor B and the reciprocal estimate $X_0$ and calculating the 1's compliment of the result. At block 308, the value $X_1$ is calculated by multiplying the values $X_0$ and $R_0$.

At decision block 310, it is determined if the operand type indicator OT indicates that the operands A and B are single precision values. If so, the method flow moves to block 312 and the quotient value $Q_i$ is calculated by performing a rectangular multiplication of the values A and $X_1$. The method flow proceeds to block 314 and the value $Q_i$ is rounded, based on the rounding control RC, to obtain the single precision floating-point quotient $Q_f$. To determine how the quotient will be rounded, a remainder REM is determined by performing a rectangular multiplication of the divisor B by the value $Q_i$, and subtracting the result from the dividend A. The remainder REM indicates if the value $Q_i$ is greater than, less than, or equal to the true quotient Q. In an exemplary embodiment, in response to the rounding control indicator RC indicating the result $Q_f$ should not be less than the quotient Q, the rounding ensures that the single precision result $Q_f$ is greater than or equal to the quotient Q. In an alternative embodiment, in response to the rounding control indicator RC indicating the result $Q_f$ should not be more than the quotient Q, the rounding can ensure that the single precision result $Q_f$ is less than or equal to the quotient Q. At block 316, the rounded single precision quotient value $Q_f$ is provided.

Returning to block 310, if the operand type indicator OT indicates that the operands are not single precision values, the method flow moves to decision block 318. At block 318, it is determined if the operand type indicator OT indicates that the operands are extended precision values and the precision control indicates that the quotient value should be a single precision value. If not, the method flow moves to block 320. At block 320, the value $R_1$ is calculated by reducing the value $X_1$, performing a rectangular multiplication of the divisor B and the reduced $X_1$ value, and determining a complement of the result. In a particular embodiment, the value $X_1$ is a 76 bit value and the reduced $X_1$ value is formed using bits 0-26 of the value $X_1$.

The method flow moves to block 322 and the value $X_2$ is calculated by performing a rectangular multiplication of the reduced $X_1$ value and the value $R_1$. The method flow proceeds to decision block 324, and it is determined whether the operand type indicator OT indicates that the operands are double precision values. If so, the method flow proceeds to block 326.

At block 326, the quotient value $Q_i$ is calculated by performing a rectangular multiplication of the values A and $X_2$. The method flow proceeds to block 328 and the value $Q_i$ is rounded, based on the rounding control RC, to obtain the single precision floating-point quotient $Q_f$. To determine how the quotient will be rounded, a remainder REM is determined by performing a rectangular multiplication of the divisor B by the value $Q_i$, and subtracting the result from the dividend A. The remainder REM indicates if the value $Q_i$ is greater than, less than, or equal to the true quotient Q. The quotient value $Q_f$ is provided at block 316.

Returning to block 324, if the operand type indicator OT indicates the operands are not double precision values, the method flow proceeds to block 332. In addition, at block 318 if the operand type indicator OT indicates the operands are extended precision values and the precision control indicates that the quotient should be a single precision value, the method flow moves to block 332.

At block 332, it is determined whether the precision control indicator PC indicates that the quotient should be a single precision value. If so, the method flow moves to block 346 and the quotient value $Q_i$ is calculated by performing a rectangular multiplication of the value $X_1$ and a truncated value of the dividend A. In a particular embodiment, the dividend A is a 76 bit value, and the truncated A value is formed based on bits 0-26 of the value A.

The method flow proceeds to block 342 and the value $Q_i$ is rounded, based on the rounding control RC, to obtain the single precision floating-point quotient $Q_f$. To determine how the quotient will be rounded, a remainder REM is determined by performing a rectangular multiplication of the divisor B by the value $Q_i$, and subtracting the result from the dividend A. The remainder REM indicates if the value $Q_i$ is greater than, less than, or equal to the true quotient Q. The quotient value $Q_f$ is provided at block 316.

If, at block 332, it is determined that the precision control indicator PC does not indicate that the quotient should be a single precision value, the method flow moves to decision block 334. At block 334, it is determined whether the precision control indicator PC indicates that the quotient should be a double precision value. If so, the method flow moves to block 346 and the quotient value $Q_i$ is calculated by performing a rectangular multiplication of the value $X_2$ and the dividend A. The method flow proceeds to block 342, described previously.

If, at block 334, it is determined that the precision control indicator PC does not indicate that the quotient should be a double precision value, the method flow moves to block 336 and the value $R_2$ is calculated by reducing the value $X_2$ to determine a reduced $X_2$ value, performing a rectangular multiplication of the divisor value B and the reduced $X_2$ value determining a complement of the result. In a particular embodiment, the value $X_2$ is a 76 bit value and the reduced $X_2$ value is formed using bits 0-53 of the value $X_2$. The method flow moves to block 338 and the value $X_3$ is calculated by performing a rectangular multiplication of the values $X_2$ and $R_2$. The method flow proceeds to block 340 and the quotient value $Q_i$ is calculated by performing a rectangular multiplication of the values A and $X_3$. The method flow proceeds to block 342, described previously.

Figure 4:
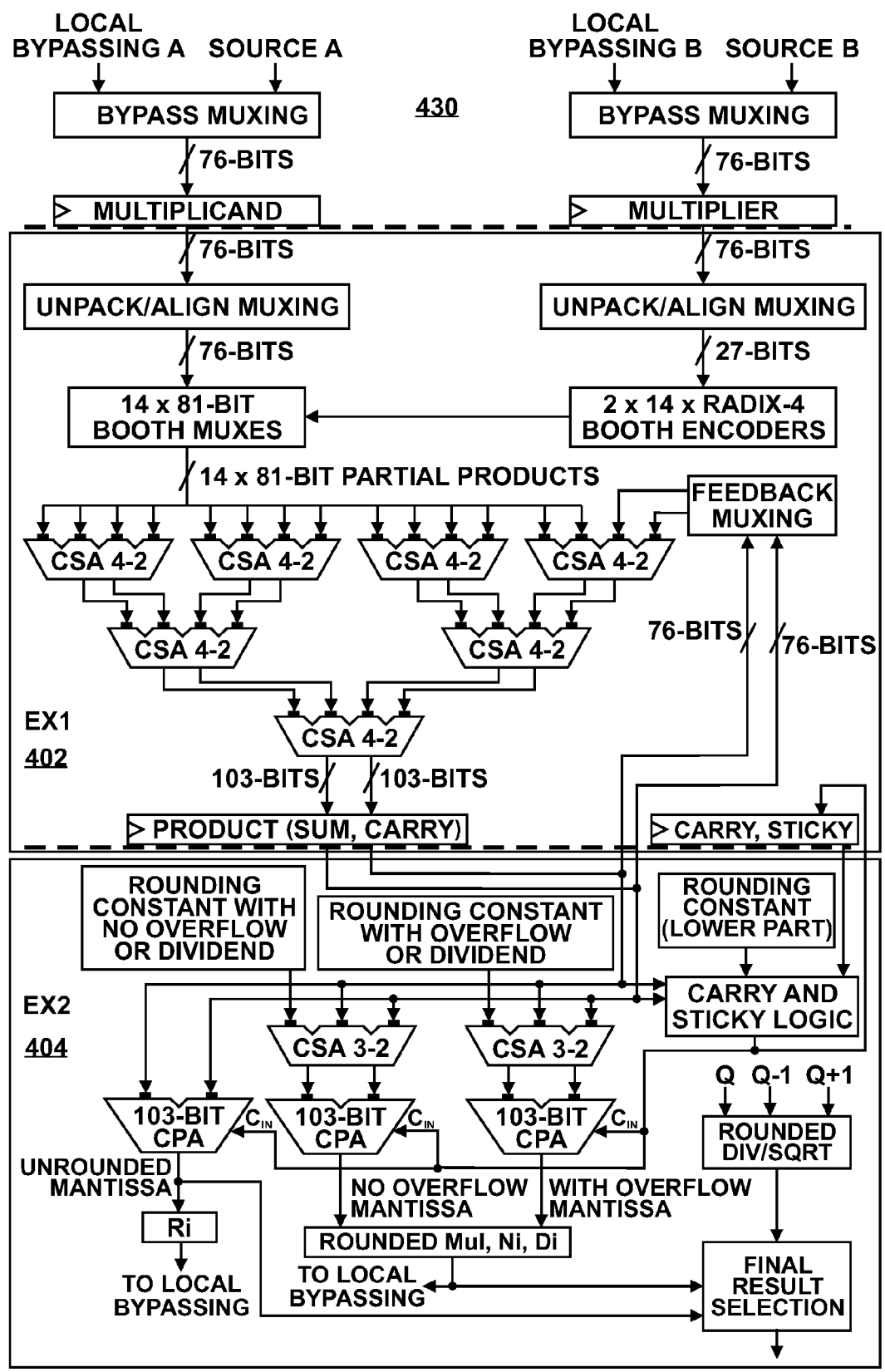
FIG. 4 is a block diagram of a particular embodiment of a rectangular multiplier of the data processor of FIG. 1.

Referring to FIG. 4, a particular embodiment of a rectangular floating point multiplier 430, corresponding to the multiplier 130 of FIG. 1 is illustrated. The rectangular floating-point multiplier is implemented in two pipeline stages as shown in FIG. 4. The first stage 402 includes of a 76-bit×27-bit multiplier which accepts a 76-bit feedback term in a redundant carry-save format and produces a 103-bit product in a redundant carry-save format. The second stage 404 includes combined rounding and addition, result multiplexing and finally forwarding to the register file and bypass networks. The multiplier 430 supports a range of precisions with wider precision multiplies achieved by multiple passes through the first stage. The supported precisions include 24×24, 25×24, 27×76, 53×53, 54×53, 54×76, 66×66, 68×68 and 76×76. The multiplier also supports two single precision (dual 24×24) multiplications in parallel.

For each pass through the multiplier 430 the appropriate 27-bits of the multiplier operand are selected by the Unpack/Align Multiplexers. Two sets of radix-4 Booth encoders are required to support the dual 24-bit by 24-bit multiplication mode. The Booth multiplexers produce fourteen 81-bit partial products which are compressed along with the two 76-bit feedback terms using a partial product reduction tree implemented using 3 levels of 4-2 compressors. For the first pass the feedback terms are all zeros. For subsequent passes, the feedback terms are obtained from the upper 76-bits of the carry-save product produced by the previous pass.

The rounding scheme implemented in the second stage 404 involves adding a rounding constant to the carry-save product using a 3-2 carry-save adder prior to the addition. The rounding is performed prior to normalization using two additions, with one addition assuming no overflow occurs and one addition assuming overflow occurs. A third addition computes the unrounded mantissa. Since for wider precision multiplies the product generation is split over multiple cycles, the lower 27-bits are processed after each pass to compute sticky and the carry-in for the next pass. The appropriate rounding constant is taken into account for the first two additions and is omitted for the unrounded mantissa, which requires two separate carry trees.

What is claimed is:

1. A method implemented by a floating point unit of a processor, comprising:
    determining a first precision indicator;
    estimating a reciprocal $[X_0]$ of a divisor to determine a reciprocal estimate;
    determining a first product $[D_0]$ based on a rectangular multiplication of the divisor and the reciprocal estimate;
    determining a first complement value $[R_0]$ based on a complement of the first product;
    determining a second product $[N_0]$ based on a rectangular multiplication of the reciprocal estimate and a dividend; and
    determining a quotient of the divisor and the dividend at a rectangular multiplier based on the second product, the precision indicator, and a portion of the first complement value.

2. The method of claim 1, wherein the rectangular multiplication of the divisor and the reciprocal estimate comprises a multiply-add operation.

3. The method of claim 1, further comprising:
    reducing the first complement value to determine the portion of the first complement value.

4. The method of claim 3, wherein determining the quotient further comprises:
    iteratively determining a first series of products, wherein an Nth product of the first series of products is based on a rectangular multiplication of an N−1 product of the first series of products and the N−1 complement value of a series of complement values, the first series of products including the first product;
    iteratively determining a second series of products, wherein an Nth product of the second series of products is based on a rectangular multiplication of an N−1 product of the second series of products and an N−1 complement value of the series of complement values, the second series of products including the second product;
    iteratively determining the series of complement values, wherein the Nth complement value of the series of complement values is based on a complement of the Nth product of the first series of products, the series of complement values including the first complement value; and
    determining the quotient based on a rectangular multiplication of the Nth product of the second series of products and the Nth complement value of the series of complement values.

5. The method of claim 3, wherein determining the quotient further comprises:
    determining a third product based on the portion of the first complement value and the first product;
    determining a fourth product based on the portion of the first complement value and the second product;
    determining a second complement value based on a complement of the third product; and
    determining the quotient based on a rectangular multiplication of the fourth product and the second complement value.

6. The method of claim 3, wherein determining the quotient comprises determining the quotient based on a rectangular multiplication of the portion of the first complement value and the second product in response to determining that the precision indicator indicates a single precision division.

7. The method of claim 3, wherein determining the quotient comprises:
    determining a third product based on a rectangular multiplication of the portion of the first complement value and the first product;
    determining a second complement value based on the third product;
    determining a fourth product based on a rectangular multiplication of a portion of the first complement value and the second product; and
    determining the quotient based on a rectangular multiplication of a portion of the second complement value and the fourth product in response to determining that the precision indicator indicates a double precision division.

8. The method of claim 3, wherein determining the quotient comprises determining the quotient based on a rectangular multiplication of the portion of the first complement value and the second product in response to determining that the precision indicator indicates an extended precision division of a first type.

9. The method of claim 3, wherein determining the quotient comprises:
   determining a third product based on a rectangular multiplication of the portion of the first complement value and the first product;
   determining a second complement value based on the third product;
   determining a fourth product based on a rectangular multiplication of the portion of the first complement value and the second product; and
   determining the quotient based on a rectangular multiplication of the second complement value and the fourth product in response to determining that the precision indicator indicates an extended precision division of a second type.

10. The method of claim 3, wherein determining the quotient comprises:
    determining a third product based on a rectangular multiplication of the portion of the first complement value and the first product;
    determining a second complement value based on the third product;
    determining a fourth product based on a rectangular multiplication of the portion of the first complement value and the second product;
    determining a fifth product based on a rectangular multiplication of the second complement value and the third product;
    determining a third complement value based on the fifth product;
    determining a sixth product based on a rectangular multiplication of the second complement value and the fourth product; and
    determining the quotient based on a rectangular multiplication of the third complement value and the sixth product in response to determining that the precision indicator indicates an extended precision division of a third type.

11. The method of claim 1, further comprising:
    determining a rounding control indicator; and
    rounding the quotient based on the rounding control indicator.

12. The method of claim 1, wherein the precision control indicates an operand type of the dividend and the divisor.

13. A method implemented by a floating point unit of a processor, comprising:
    determining a first precision indicator;
    estimating a reciprocal of a divisor to determine a reciprocal estimate;
    determining a first product based on a multiplication of the reciprocal estimate and the divisor;
    determining a first complement value based on a complement of the first product;
    determining a second product based on a rectangular multiplication of the first complement value and the reciprocal estimate;
    determining a quotient of the divisor and the dividend at a rectangular multiplier based on a portion of the second product, the precision indicator, and the dividend.

14. The method of claim 13, further comprising:
    reducing the second product to determine the portion of the second product.

15. The method of claim 14, wherein determining the quotient comprises determining the quotient based on a rectangular multiplication of the second product and the dividend in response to determining that the precision indicator indicates a single precision division.

16. The method of claim 15, wherein determining the quotient comprises:
    determining a third product based on a rectangular multiplication of the portion of the second product and the divisor;
    determining a second complement value based on the third product;
    determining a fourth product based on a rectangular multiplication of the second complement value and the portion of the second product; and
    determining the quotient based on a rectangular multiplication of the fourth product and the dividend in response to determining that the precision indicator indicates a double precision division.

17. The method of claim 16, wherein determining the quotient comprises:
    determining a fifth product based on a rectangular multiplication of a portion of the fourth product and the divisor;
    determining a third complement value based on the fifth product;
    determining a sixth product based on a rectangular multiplication of the portion of the third complement value and the fourth product; and
    determining the quotient based on a rectangular multiplication of the sixth product and the dividend in response to determining that the precision indicator indicates an extended precision division.

18. The method of claim 13, wherein estimating a reciprocal of a divisor comprises determining the reciprocal estimate based on a look-up table.

19. A floating point unit, comprising:
    an input configured to receive a first precision indicator, a divisor, and a dividend;
    a lookup table configured to provide a reciprocal estimate based on a reciprocal of a divisor;
    a multiplier coupled to the lookup table and to the input, the multiplier configured to:
       determine a first product based on a multiplication of the divisor and the reciprocal estimate;
       determine a first complement value based on a complement of the first product;
       determine a second product based on a multiplication of the reciprocal estimate and a dividend; and
       determine a quotient of the divisor and the dividend based on the second product, the precision indicator, and a portion of the first complement value; and
    an output configured to provide the quotient.

20. The floating point unit of claim 19, wherein the multiplier is a rectangular multiplier.

* * * * *